Feb. 11, 1941. W. C. McKESSON 2,231,632
HEATER
Filed March 22, 1937 2 Sheets-Sheet 1

Inventor:
William C. McKesson
by Max Richard Kraus
atty.

Feb. 11, 1941. W. C. McKESSON 2,231,632
HEATER
Filed March 22, 1937 2 Sheets-Sheet 2
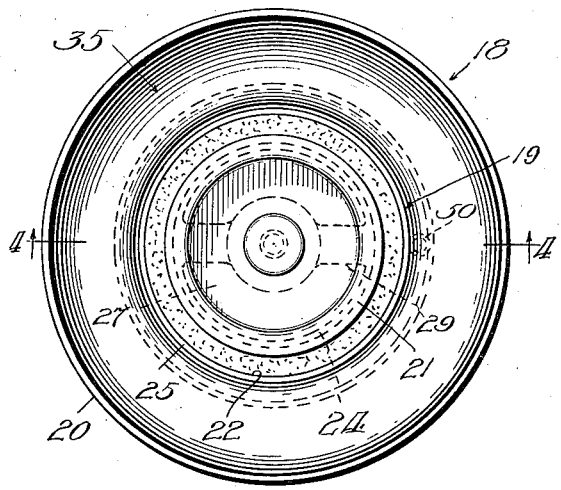
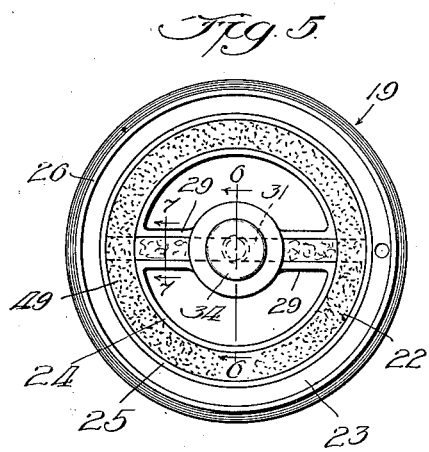
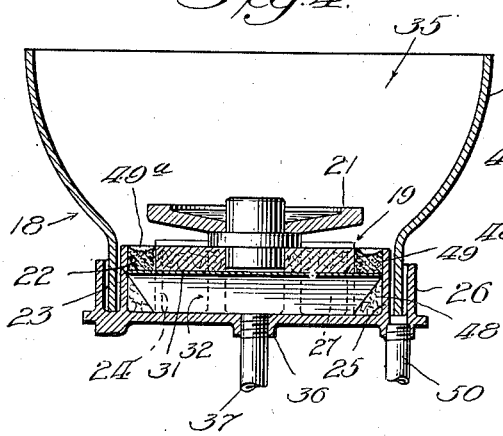
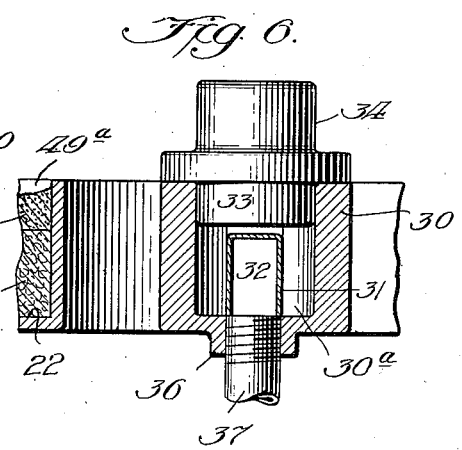
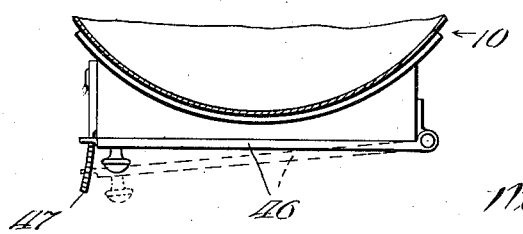
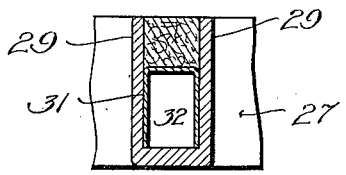
Inventor:
William C. McKesson.

Patented Feb. 11, 1941

2,231,632

UNITED STATES PATENT OFFICE 2,231,632

HEATER

William C. McKesson, Chicago, Ill.

Application March 22, 1937, Serial No. 132,204

2 Claims. (Cl. 67—70)

This invention relates to heaters and more particularly to burners used in connection with oil heaters.

One of the objects of my invention is to provide a new and improvised oil heater which can be economically operated and which generates a maximum of heat.

Another object is to provide an oil burner which can be utilized with any standard stove or heater by merely inserting it therein.

Other objects will become apparent as this description progresses.

In the drawings Figure 1 is a top plan view showing the heater and the fuel supply;

Figure 3 is a top view of my heating unit;

Figure 4 is a cross sectional view taken on the line 4—4 of Figure 3;

Figure 5 is a top view of the burner element;

Figure 6 is a cross sectional view taken on the line 6—6 of Figure 5;

Figure 7 is a cross sectional view taken on line 7—7 of Figure 5;

Figure 8 is a top plan view showing the draft door.

Figure 1:
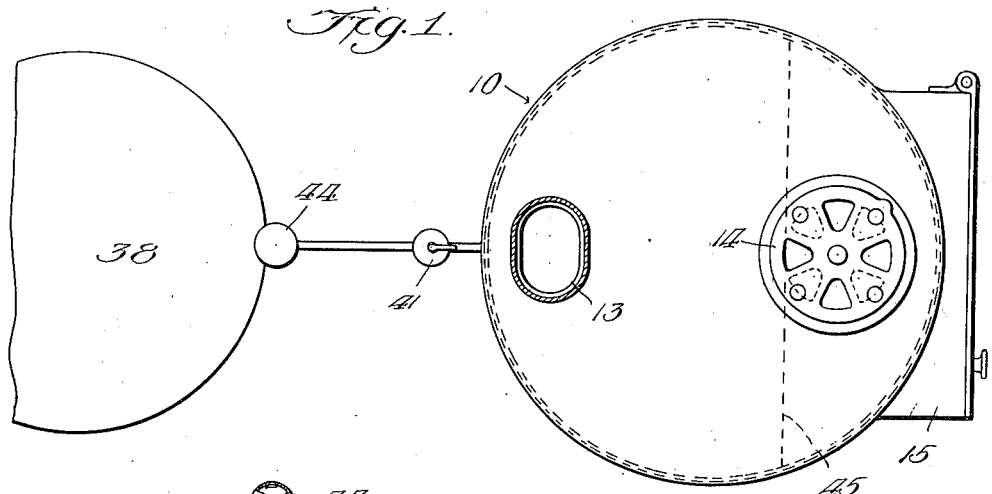

In the drawings I show a conventional stove or heater indicated generally at 10 which is supported by a plurality of legs 11. The heater is provided with a flue 13, rotatable draft shutter 14 and entrance door 15. Spaced from the bottom of said housing is a horizontal support or grate rest 16 which is provided with an enlarged annular opening 17. Positioned on said support directly over said opening is an oil heating unit indicated generally at 18 which comprises a burner 19, a bowl shaped member 20 and a baffle spreader 21. The burner 19 has a pair of annular channels 22 and 23 which are formed by upstanding walls 24, 25 and 26. Diametrically connecting the channel 22 is a bridging or cross channel 27 which is formed by a pair of walls 29. Centrally of said bridging channel 27 I provide an annular head 30, the interior 30a which forms a communicating duct with the cross channel 27. Positioned within said bridging channel 27 is an inverted U-shaped channel 31 which extends into channel 22 and which provides a communicating passageway 32 for the fuel from the duct, 30a, to the annular channel 22. As shown in Figures 5 and 7 the top of said bridging channel is sealed by cement or the like. However, if it is desired, the bridging channel can be cast so as to provide a communicating duct with the annular channel in any other well known manner.

To close the top of the head 30 I provide a plug 33 which has an enlarged boss 34 to which is secured the dished baffle spreader 21 which is made of refractory material. Supported within the annular channel 23 is the bowl 20 which forms a combustion chamber 35. Threaded to the opening in the bottom of the burner as at 36 is a pipe 37 which leads from a container 38 in which is contained the fuel oil. The container is supported on a suitable standard 39. Provided in the pipe 37 are a pair of manually operated valves 40 and 41. Also communicating with said pipe through a nipple 42 is an air pipe 43 to which is secured an air pressure bulb 44.

Within the heater 10 there is a baffle plate 45, while adjacent the lower end of the heater I provide a swingable draft door 46 (Figures 2 and 8) which can be adjusted in varied open positions on the rack 47.

Within the channel 22 of the burner 19 I place a mixed refractory composition which intensifies the flame and permits greater heat to be produced. Approximately ⅔ of the lower depth of the channel 22 is filled with a refractory substance 48, which is preferably formed of crushed carborundum about ¼ inch size which has been treated to a bath in a solution of about ½ commercial silicate of soda (water glass) with an equal amount of water and mixed with enough powdered graphite to make a consistency of cream after it has dried. Other refractory substances such as fire brick or crushed silicate can be used in place of carborundum if desired. The top of about ⅓ of the depth of the channel is filled with a composition 49, which is made up of a mixture of an equal amount of flake asbestos and mica in the form of "porosol", this is mixed with a small amount (about ⅕) of graphite in powdered form to give said mixture a graphite coating. The top mixture is pressed down tightly in the channel over the bottom mixture and is shaped slightly concave between the channel as at 49a.

With the valves 40 and 41 open, the fuel oil in the container 38 will by gravity be forced through the pipe 37, into the conduit 30a through the passageway 32 into the channel 22 where it will be forced into and through the composition 48 and 49, thus saturating it with oil. Any surplus fuel will overflow into the channel 23 and will be drained therefrom by an outlet pipe 50. The outlet pipe can lead to a suitable basin (not shown) which is covered with a fine screen to prevent any of the accidental flames from passing therethrough.

In order to initially start the burner into operation the valves 40 and 41 are first opened and the fuel will pass from the container 38 through the pipe 37 into the duct 30a then through bridge conduit 32 and into the composition 48 and 49 which will be thoroughly saturated. The valves are then closed. The composition is then ignited by a match and allowed to burn for a few moments after which the valves are again opened to permit the fuel to continue to feed, and to continue saturating the composition. In initially starting the flame it is best to keep the draft door 46 fully closed but after the flame gains headway the draft door 46 can be opened to the extent desired so that the draft can come up through the pit of the stove and through the opening 17 where it is diverted by the baffle spreader 21 to combine with the flame.

Figure 2:
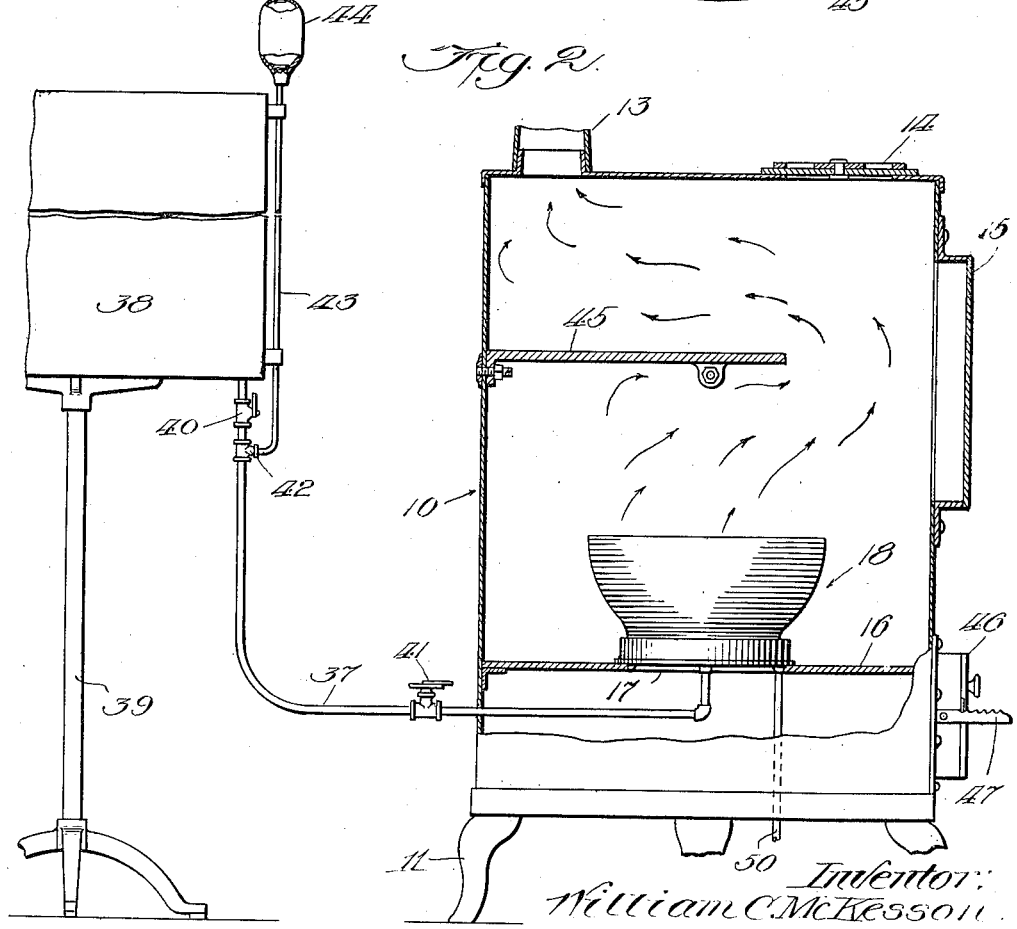
Figure 2 is a side elevational view partly in cross section showing the heating unit.

As shown in Figure 2, I place an air pipe 43 in communication with the pipe 37, so that in the event that the sediment in the fuel tends to settle in the bottom of the container 38 and to clog the opening leading to pipe 37, I can by closing the valve 41 and opening valve 40 and by pressing the bulb 44 admit air pressure into the container to agitate the sediment and blow it away from the opening, so that it will not obstruct the flow of fuel oil. Also in first starting the burner, compressed air can be injected into the compositions 48 and 49 by closing valve 40 and opening valve 41 and operating the bulb 44. This will facilitate starting the flame. Also if it is desired to remove the carbon which will gather on the composition, this compression device can be operated as just described when the burner is not in heating operation.

It will be understood that after a time, the composition should be replaced and this can be easily done by removing the remaining burned composition in the channel and refilling it with a new similar composition. It will also be understood that though I show my burner in a particular heating unit, that the burner can be readily inserted and placed in the conventional coal stove or the like by simply removing the draw center from the grates from such stoves and placing my burner on the grate and sealing the sides of the burner so that the draft air will be admitted only from the pit or bottom of said stove.

It will be understood that various modifications can be made without departing from the spirit and scope of my invention.

What I desire to secure by Letters Patent is:

1. A wick for oil burners including relatively large particles of carborundum in a loose state and treated with a mixture of sodium silicate and graphite to provide a coating for said particles, and a separate layer comprising particles of asbestos and mica in a more compact state, the latter particles being treated with powdered graphite.

2. A wick for oil burners including relatively large particles of a silicate in a loose state and treated with a mixture of sodium silicate and graphite to provide a coating for said particles, and a separate layer comprising particles of asbestos in a more compact state, the latter particles being treated with a powdered graphite.

WILLIAM C. McKESSON.